US010212199B2

(12) United States Patent
Robbins et al.

(10) Patent No.: US 10,212,199 B2
(45) Date of Patent: *Feb. 19, 2019

(54) SYNCHRONIZATION BASED ON DEVICE PRESENCE

(71) Applicant: AT&T Intellectual Property I, L.P., Atlanta, GA (US)

(72) Inventors: William Robbins, Sun Prairie, WI (US); Judson Flynn, Decatur, GA (US); Randolph Wohlert, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,845

(22) Filed: Jan. 3, 2018

(65) Prior Publication Data
US 2018/0131729 A1 May 10, 2018

Related U.S. Application Data

(63) Continuation of application No. 12/966,442, filed on Dec. 13, 2010, now Pat. No. 9,894,108.

(51) Int. Cl.
*H04L 29/06* (2006.01)
*H04L 29/08* (2006.01)

(52) U.S. Cl.
CPC ...... *H04L 65/1069* (2013.01); *H04L 65/1073* (2013.01); *H04L 67/18* (2013.01); *H04L 67/28* (2013.01)

(58) Field of Classification Search
None
See application file for complete search history.

(56) References Cited

U.S. PATENT DOCUMENTS

| 8,054,815 | B2 | 11/2011 | Evans |
| 8,271,625 | B2 | 9/2012 | Kwon et al. |
| 8,949,420 | B2 * | 2/2015 | Banavar ............... H04L 29/06 709/225 |

(Continued)

OTHER PUBLICATIONS

Office Action received for U.S. Appl. No. 12/966,442, dated Feb. 28, 2013, 24 pages.

(Continued)

*Primary Examiner* — Joshua Joo
(74) *Attorney, Agent, or Firm* — Amin, Turocy & Watson, LLP

(57) ABSTRACT

An architecture that can facilitate initiation of an automatic synchronization operation based upon presence information in connection with a wireless communications network is provided. For example, when certain mobile devices register with a particular network entity (e.g., a femtocell) that services a particular target location (e.g., place of residence), then such registration can be leveraged to indicate presence at the target location. Accordingly, synchronization between the mobile device and other devices can be automatically initiated, without requiring input or effort by a user, or even that the user remembers to perform the synchronization operation. Moreover, the synchronization operation can be wireless, so connection cables need not be maintained or employed.

20 Claims, 12 Drawing Sheets

(56) References Cited

U.S. PATENT DOCUMENTS

| | | | |
|---|---|---|---|
| 2003/0104819 A1* | 6/2003 | Knauerhase | H04W 4/02 455/456.1 |
| 2004/0109436 A1 | 6/2004 | Vargas et al. | |
| 2005/0003818 A1 | 1/2005 | Kanto et al. | |
| 2005/0187971 A1 | 8/2005 | Hassan et al. | |
| 2006/0159109 A1 | 7/2006 | Lamkin et al. | |
| 2006/0161635 A1 | 7/2006 | Lamkin et al. | |
| 2006/0271696 A1 | 11/2006 | Chen et al. | |
| 2007/0142065 A1 | 6/2007 | Richey et al. | |
| 2007/0244930 A1 | 10/2007 | Bartlette et al. | |
| 2007/0282848 A1* | 12/2007 | Kiilerich | G06F 17/30053 |
| 2007/0286099 A1* | 12/2007 | Stocklein | H04L 67/22 370/259 |
| 2008/0052124 A1 | 2/2008 | Goodman et al. | |
| 2008/0168526 A1 | 7/2008 | Robbin et al. | |
| 2008/0209491 A1 | 8/2008 | Hasek | |
| 2008/0305811 A1 | 12/2008 | Cai et al. | |
| 2009/0034952 A1 | 2/2009 | Clark | |
| 2009/0131080 A1 | 5/2009 | Nadler et al. | |
| 2009/0157792 A1* | 6/2009 | Fiatal | G06Q 30/04 709/201 |
| 2009/0193019 A1 | 7/2009 | Hassan et al. | |
| 2009/0276531 A1* | 11/2009 | Myka | G06Q 10/1095 709/227 |
| 2009/0286540 A1 | 11/2009 | Huber et al. | |
| 2009/0316649 A1 | 12/2009 | Chen | |
| 2010/0040023 A1 | 2/2010 | Gallagher et al. | |
| 2010/0066498 A1 | 3/2010 | Fenton | |
| 2010/0128677 A1 | 5/2010 | Liu et al. | |
| 2010/0210302 A1 | 8/2010 | Santori, Jr. et al. | |
| 2010/0238919 A1 | 9/2010 | Froelich | |
| 2011/0034127 A1 | 2/2011 | Wentink et al. | |
| 2011/0082940 A1 | 4/2011 | Montemurro et al. | |
| 2011/0098043 A1 | 4/2011 | Yu et al. | |
| 2011/0149928 A1 | 6/2011 | Wu et al. | |
| 2011/0153668 A1 | 6/2011 | Walker et al. | |
| 2012/0149414 A1 | 6/2012 | Krishnaswamy et al. | |
| 2012/0297311 A1 | 11/2012 | Duggal | |
| 2013/0133029 A1 | 5/2013 | Omori | |
| 2014/0098956 A1 | 4/2014 | Hansen et al. | |

OTHER PUBLICATIONS

Office Action received for U.S. Appl. No. 12/966,442, dated Apr. 23, 2014, 28 pages.
Office Action received for U.S. Appl. No. 12/966,442, dated Sep. 24, 2014, 32 pages.
Office Action received for U.S. Appl. No. 12/966,442, dated Apr. 22, 2015, 35 pages.
Office Action received for U.S. Appl. No. 12/966,442, dated Dec. 2, 2015, 44 pages.
Office Action received for U.S. Appl. No. 12/966,442, dated Aug. 25, 2016, 20 pages.
Office Action received for U.S. Appl. No. 12/966,442, dated Jun. 29, 2017, 33 pages.
Notice of Allowance received for U.S. Appl. No. 12/966,442, dated Oct. 4, 2017, 32 pages.

* cited by examiner

SYNCHRONIZATION BASED ON DEVICE PRESENCE

RELATED APPLICATION

The present application is a continuation of, and claims priority to, U.S. patent application Ser. No. 12/966,442, filed Dec. 13, 2010, and entitled "SYNCHRONIZATION BASED ON DEVICE PRESENCE," the entirety of which is hereby incorporated by reference herein.

TECHNICAL FIELD

The present application relates generally to wireless communications networks, and more specifically to utilizing device registration with a network entity such as a femtocell as an indication of presence, which can be employed to signal synchronization operations or other operations.

BACKGROUND

Today, there is widespread use of a variety of consumer electronic devices. In a common scenario, a single user will own or otherwise maintain multiple different devices, each directed to various tasks. For example, a user can maintain a mobile device for communication tasks or mobile content collection, such as taking photographs or recording conversations. That user might also have a digital video recorder (DVR) coupled to a widescreen high-definition television for recording programs for later consumption, as well as a personal computer for a variety of other endeavors.

With the widespread adoption of various media content and other data standards, many of these devices can share information. For example, various tools exist for sharing information between devices; however, existing tools all share a common shortcoming. The user must manually establish a connection between the devices, typically by way of a universal serial bus (USB) or Firewire (e.g., IEEE 1394) cable. Unfortunately, although often highly desired, users commonly forget to perform the necessary manual steps. Moreover, even if the user does remember, it is common the required connection cables have been misplaced or lost, due to the inconvenience associated with maintenance of such items.

DETAILED DESCRIPTION

Figure 1:
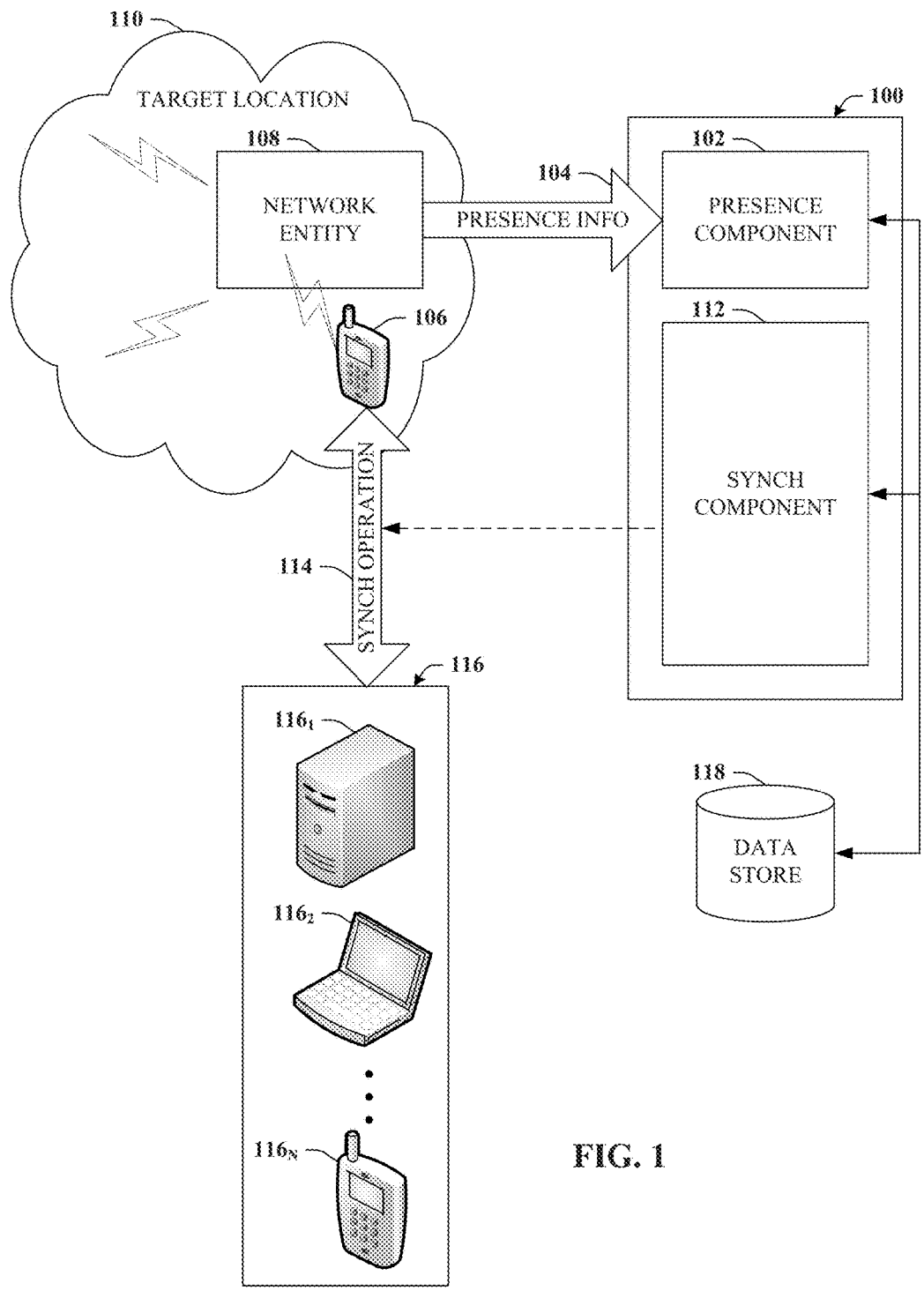
FIG. 1 is a block diagram of a system that can facilitate synchronization based upon device presence techniques in connection with a wireless communications network.

The subject matter disclosed herein, in one aspect thereof, comprises a wireless communications network architecture that can facilitate synchronization based upon device presence techniques. In accordance therewith and to other related ends, the architecture can include a presence component that can be configured to receive and store presence information characterized by network registration of a mobile device to a network entity (e.g., a femtocell) that services a target location such as a home.

In addition, the architecture can also include a synch component that can facilitate initiation of a synchronization operation between a mobile device and a remote device or devices. Initiation of the synchronization operation can occur automatically and can be based upon the presence information. Accordingly, for example, the synchronization operation can be initiated automatically when the network entity, such as a femtocell, detects the presence of the mobile device. Hence, upon arrive home, say, from work, the synchronization operation can be automatically initiated, and media content or other data included on the mobile device can be transferred to the remote device or vice versa. Moreover, the synchronization operation can be performed in a wireless manner.

Accordingly, users need not be required to remember to initiate the synchronization operation, and need not be required to maintain cables, manuals, or other equipment necessary for conventional content transfers.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 that can facilitate device synchronization based upon device presence techniques in connection with a wireless communications network is depicted. For example, by relying upon device presence techniques a practical and convenient event can form the basis of device synchronization rather than relying on manual input by a user, as is done conventionally. Moreover, by basing device synchronization on device presence, synchronization operations can be performed automatically instead of when or if the user remembers and further has the time or inclination engage in device synchronization. Furthermore, given that devices detailed herein are typically equipped with wireless communication features, device synchronization can be performed wirelessly, whereas in most conventional systems, any such synching is performed with a wired connection that is manually initiated.

Generally, system 100 can include presence component 102 that can be configured to receive and store presence information 104. Presence information 104 can be characterized by network registration of mobile device 106 to network entity 108 that services target location 110. Put another way, when mobile device 106 enters (or leaves) an area of service (e.g., target location 110) covered by network entity 108, then network entity 108 can "sense" such and provide appropriate information (e.g., presence information 104) to presence component 102 as a result. In this case, "sensing" the presence of mobile device 106 can be established when mobile device 106 registers with network entity 108 in order to utilize network entity 108 as a communications portal to a core network of the wireless communications network.

Figure 2:
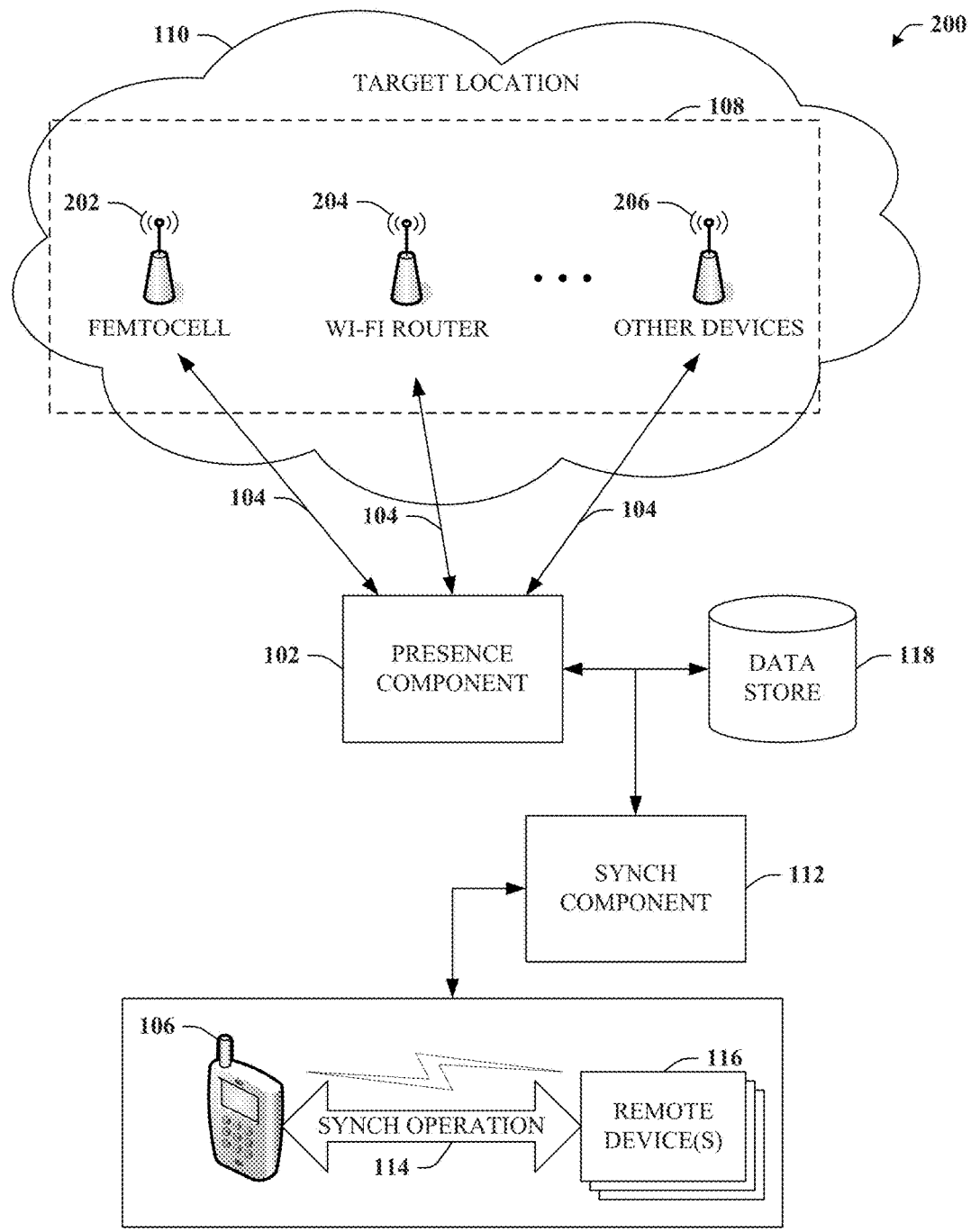
FIG. 2 provides a block diagram of a system that can provide additional features or aspects in connection with synchronization based upon device presence techniques.

Thus, network entity 108 is intended to be a suitable wireless communications network component that can provide wireless communications network services in a substantially fixed geographic area (e.g., target location 110), and that can allow or require devices to register in order to utilize the services provided while in the area of service. Such can be exemplified by FIG. 2, which can be now referenced in conjunction with FIG. 1. FIG. 2 depicts system 200 illustrating additional features or aspects of synchronization based upon device presence techniques. For example, in one or more aspect, network entity 108 can be femtocell 202 sometimes referred to as a micro cell or home Node B (HNB). Additionally or alternatively, network entity 108 can be wireless fidelity (WI-FI) router 204; or substantially any other suitable device or devices, as indicated by reference numeral 206. Hence, while it should be understood network entity 108 need not be limited to any one type of suitable network component, in the reminder of this document it is generally assumed that network entity 108 is a femtocell unless specified otherwise.

In general, femtocells (e.g., femtocell 202) are designed for indoor environments such as a home or office. Femtocells typically utilize a broadband router to carry packet-based voice and/or data to the core network of the wireless communications network via a broadband connection to the Internet such as digital subscriber line (DSL) or a cable modem. Thus, femtocells can provide a strong signal and robust services in environments that traditionally offer only poor coverage, such as that commonly experienced behind the walls of a building or other structures. Additional detail, aspects or example embodiments relating to femtocells, network entity 108, and/or other components that can be included in the wireless communications network are provided in connection with FIGS. 9-11. Moreover, it should be appreciated that, given femtocells are designed for in-home coverage, a device typically must be at home in order to register with a femtocell, and thus employ the services thereby provided, a fact that can be leveraged to provide an indication of presence.

As such, the disclosed subject matter can leverage these and other related features to obtain presence information 104, which can in turn be leveraged to provide valuable services, including automatic device synchronization that is based upon presence information 104. For example, when mobile device 106 registers with femtocell 202 (e.g., network entity 108) servicing the residential home (e.g., target location 110), then it can be presumed the operator of mobile device 106 is at home, hence establishing a degree of presence. As previously noted such information can be received and stored by presence component 102. As one example, presence component 102 can store presence information 104 to data store 118. As used herein, data store 118 is intended to be a repository of all or portions of data, data sets, or information described herein or otherwise suitable for use with the described subject matter. Data store 118 can be centralized, either remotely or locally cached, or distributed, potentially across multiple devices and/or schemas. Furthermore, data store 118 can be embodied as substantially any type of memory, including but not limited to volatile or non-volatile, sequential access, structured access, or random access, solid state, and so on. It should be understood that all or portions of data store 118 can be included in systems 100, or can reside in part or entirely remotely from systems 100.

In accordance therewith, system 100 can also include synch component 112 that can be, potentially as with other components detailed herein, an application included in a computer-readable storage medium, in execution by a processor, or the like. Synch component 112 can be configured to automatically facilitate initiation of synchronization operation 114 between mobile device 106 and one or more remote device(s) $116_1$-$116_N$, where N can be substantially any positive integer. Moreover, such automatic initiation of synchronization operation 114 can be based upon presence information 104. It should be understood that remote device(s) $116_1$-$116_N$ can be referred to herein, either collectively or individually as remote device(s) 116, with appropriate subscripts employed generally only when necessary or convenient to highlight various distinctions or to better impart the disclosed concepts. It is further understood that in one or more embodiment, target location 110 can be, but need not be, expressly limited to a residence or an office or other place of business.

Remote device(s) 116 can be substantially any suitable device or application. For example, in one or more embodiment, remote device 116 can be a personal computer or another computing device such as a laptop, gaming console, notebook, netbook, tablet, and so forth. Additionally or alternatively, remote device can be a digital video recorder (DVR) or another recording device or application. As still another example, remote device 116 can be a second mobile device, e.g., a second mobile device that is actively registered to network entity 108 or to another network entity.

Still referring to FIGS. 1 and 2, in one or more embodiment, synchronization operation 114 can be conducted wirelessly between mobile device 106 and at least one remote device 116. Hence, when mobile device 106 enters target location 110, network entity 108 can register mobile device 106, and presence component 102 can log presence information 104. Based upon that presence information 104, synch component 112 can facilitate launch of synchronization operation 114. Synchronization operation 114 can be automatically launched, and thus need not be subject to a user remembering to synchronize various data sets. Further synchronization operation 114 can be performed wirelessly and therefore need not require input or effort on behalf of the user by, e.g., plugging in cables or otherwise physically attaching mobile device 106 to remote device 116.

As used herein, synchronization operation 114 is generally intended to relate to substantially any type of operation or procedure devoted to copy or replicating one or more data sets. More specifically, synchronization operation 114 can be directed to copying or replicating media content, such as movies, clips, television shows, music, or other audio/visual content. For instance, in one or more embodiment, synchronization operation 114 can include transmission of media content from mobile device 106 to remote device(s) 116. Likewise, synchronization operation 114 can include transmission of media content from remote device(s) 116 to mobile device 106.

However, it is understood that synchronization operation 114 need not necessarily be limited only to transmission of and/or copy or replicating media content. For example, in one or more embodiment, synchronization operation 114 can include a backup operation configured to copy data included on mobile device 106 to remote device(s) 116. For instance, settings, apps, contact information or the like can be copied for later access or recall, e.g., to load to a new mobile device should the original mobile device be lost or damaged.

Figure 3:
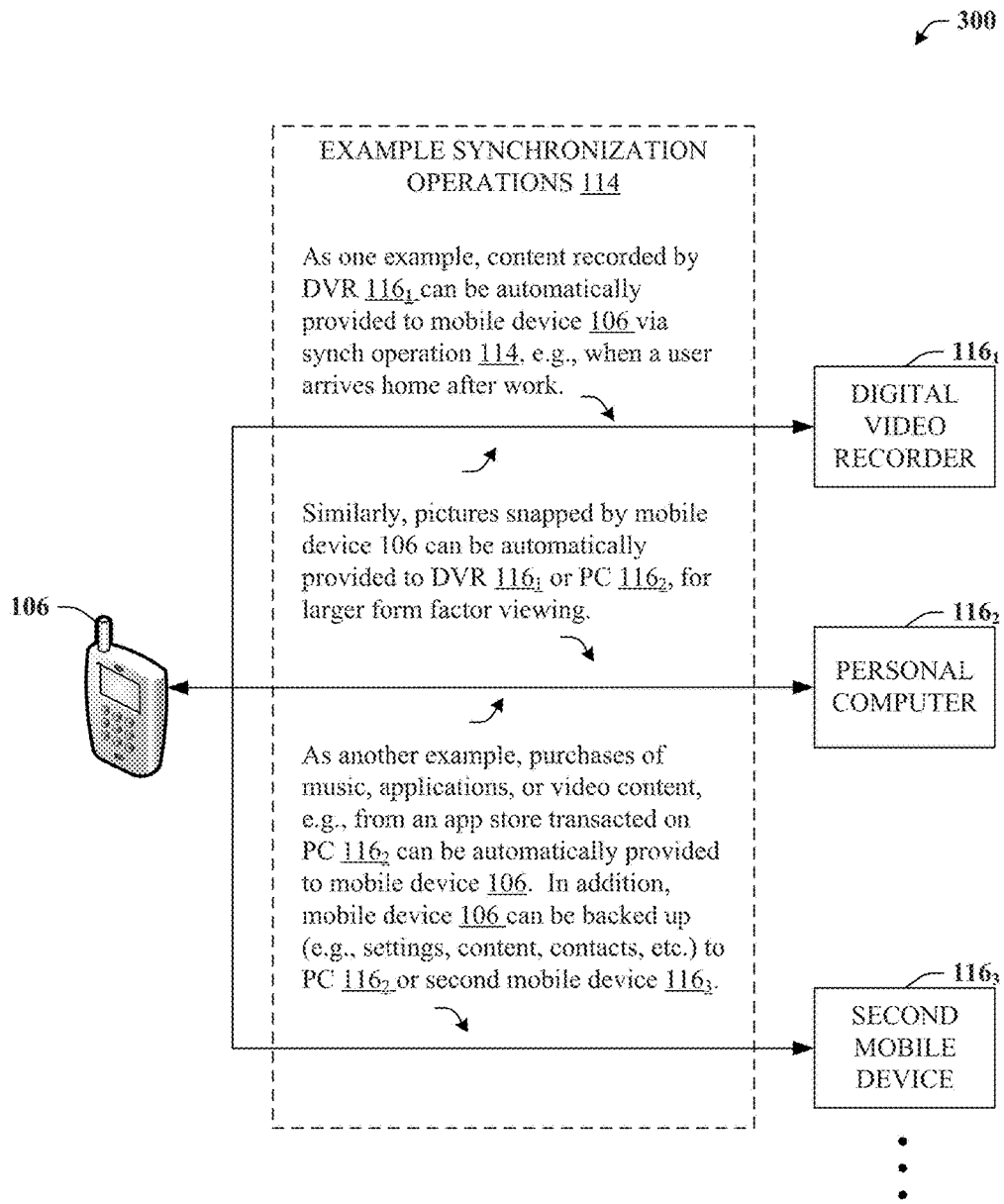
FIG. 3 provides a block diagram of a system illustrating various example synchronization operations.

In order to provide a few additional concrete examples, FIG. 3 can now be referenced. System 300 of FIG. 3 illustrates various example synchronization operations 114. As indicated previously, all or a portion of these or other example synchronization operations 114 can be conducted wirelessly and can be initiated automatically based upon presence information 104 associated with mobile device 106. As depicted, mobile device 106 can be communicatively coupled to various remote devices, such as digital video recorder (DVR) 116$_1$, personal computer (PC) 116$_2$, second mobile device 116$_3$, and so on, as is illustrated. Accordingly, mobile device 106 can be engaged in synchronization operation 114 with any such remote device, and synchronization operation 114 can be conducted in a wireless manner, as noted previously.

By way of non-limiting illustration, consider the scenario in which Sarah arrives home from work and begins preparing for a business flight. Previously, Sarah had configured DVR 116$_1$ to record the season finale of her favorite television program that aired the previous evening and to upload the program to her mobile device 106, so she could view the season finale during her flight. Unfortunately, in her rush to depart for the airport, Sarah forgot all about the recording on DVR 116$_1$. However, by employing the disclosed subject matter, presence component 102 can detect Sarah's presence when she arrives home from work as her mobile device 106 registers with her home femtocell 202. Furthermore, synch component 112 can automatically facilitate the initiation of synchronization operation 114. Thus, the season finale of Sarah's favorite show can be downloaded to her mobile device 106 automatically, even though she forgot.

As another example, consider the scenario in which Sarah returns home from the local museum in which she used her mobile device 106 to snap several pictures. She had hoped to upload these pictures to her DVR 116$_1$, or her PC 116$_2$ so that her family can view the pictures on a larger form factor display. As Sarah arrives home, that fact can be registered and synch component 112 can automatically begin wirelessly uploading the pictures based upon presence information 104.

As a third non-limiting example, consider the two scenarios in which Sarah (1) purchases music applications, video content, or other data from an app store transacted on her PC 116$_2$. As detailed herein, such content can be automatically transferred to her mobile device 106 (or vice versa if instead transacted on mobile device 106); or (2) Sarah would like to periodically back up her contacts and other data on her mobile device 106 to her PC 116$_2$, or would like to make a one-time transfer of all the data, apps, settings, etc. to the new phone she recently purchased as an upgrade (e.g., second mobile device 116$_3$). In either case, synch component 112 can automatically facilitate initiation of synchronization operation 114 in order to affect a backup operation.

It should be appreciated that for some or all of the scenarios presented above, as well as for other potential scenarios, synchronization operation 114 can be provided further based upon various criteria, which is further detailed in connection with FIG. 4.

Figure 4:
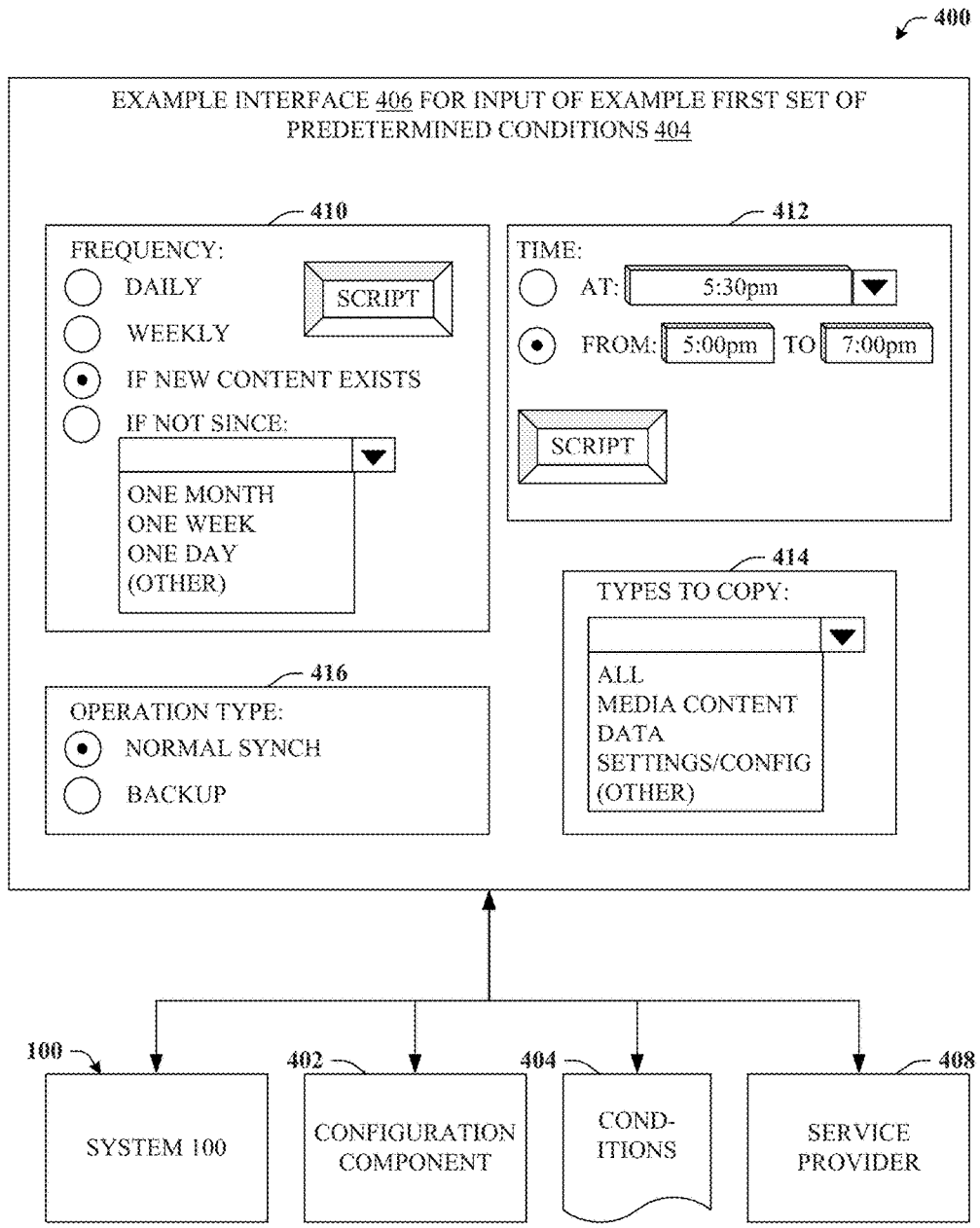
FIG. 4 illustrates a graphic depiction of a user interface for input and/or configuration of the set of predetermined conditions or other related parameters.

Referring now to FIG. 4, system 400 that can provide additional features or aspects in connection with synchronization based upon device presence is illustrated. In general, system 400 can include all or a portion of components detailed herein with reference to system 100. For example, system 100 can include synch component 112, which can be, in one or more embodiment, further configured to automatically facilitate initiation of synchronization operation 114 based upon satisfaction of one or more sets of predetermined conditions 404.

In accordance therewith, system 400 can further include configuration component 402 that can be configured to determine if the one or more sets of predetermined conditions 404 is satisfied. For example, configuration component 402 can examine data sets included in mobile device 106 and/or remote device(s) 116, as well as other data sets, in order to determine whether or not certain criteria has been satisfied, and if so, whether synch component 112 will facilitate initiation of synchronization operation 114.

Moreover, configuration component 114 can be further configured to provide user interface 406. User interface 406 can be configured to enable input of or updates to sets of predetermined conditions 404. Accordingly, user interface 406 can be, e.g., a website hosted by wireless communications network service provider 408, provided by an application running on one or more of the devices detailed herein, or the like.

In more detail, sets of predetermined conditions 404 can relate to or include various suitable settings or characteristics. For example sets of predetermined conditions 404 can include one or more of (1) a setting related to a frequency of synchronization operation 114; (2) a setting related to a time since a last synchronization operation 114; (3) a setting related to a time in which, or a period of time during which to initiate synchronization operation 114; (4) a setting related to one or more types of data or content to copy (e.g., for synching or backing up); (5) a setting related to whether or not content or other data suitable for copying exists on mobile device 106 or remote device(s) 116; and so forth.

It is understood that the above examples of predetermined conditions 404 are intended to be concrete illustrations rather than necessary limitations. Moreover, the above mentioned examples of sets of predetermined conditions 404 can be configured or updated by way of various I/O mechanisms or objects as illustrated in user interface 406. For example, user interface 406 can include multiple sub-interfaces, as well as any combination of interface objects such as input boxes, drop-down menus, radio buttons, check-boxes, dialog boxes, menu bars, widgets, confabulators, and so forth. Appreciably, the above can differ based upon differing applications and/or form factors utilized to provide and/or access user interface 400.

In the illustrated examples, UI feature 410 depicts various radio buttons that can be employed for configuring a setting related to frequency, for instance, whether synchronization operation 114 should be invoked on a daily basis, a weekly basis, if new content exists (e.g., new content extant on mobile device 106 or remote device(s) 116 that has not yet been synched), or if no synchronization operation 114 has been performed in a particular period of time, such as a month, a week, a day, or some other time frame. In addition, UI feature 410 (as well as other sections of user interface 400) can also include a "Script" button in which scripts for more complex conditions 404, or conditions otherwise not available by default or ready selection.

In addition, user interface 400 can further include UI feature 412 that can relate to specific times for initiation of synchronization operation 114. For example, UI feature 412 can also include a drop-down menu and radio buttons, for example, to select a specific time for synchronization operation 114. For instance, continuing the example scenarios introduced above, suppose Sarah typically arrives home from work at 5:25 pm on weekdays, and she only wants synchronization operation 114 to be initiated at that time of day rather than each time she arrives at home. Thus, she can select 5:30 pm as illustrated with the drop-down menu. Alternatively, to ensure synchronization operation 114 is initiated every day, even if Sarah is slightly late in arriving home, a range of times can be entered into the form files, in this case from 5:00 pm to 7:00 pm.

Other example UI features can include UI feature 414, which can be employed to specify types of content to be synched for one or more particular sets of predetermined conditions 404. For instance, all or portions of information can be select, all or portions of media content, all or portions of data content, all or portions of settings or configurations, or the like. Likewise, UI feature 416 can be employed to specifically select whether synchronization operation 114 should be directed to a normal synch or a backup operation.

Figure 5A:
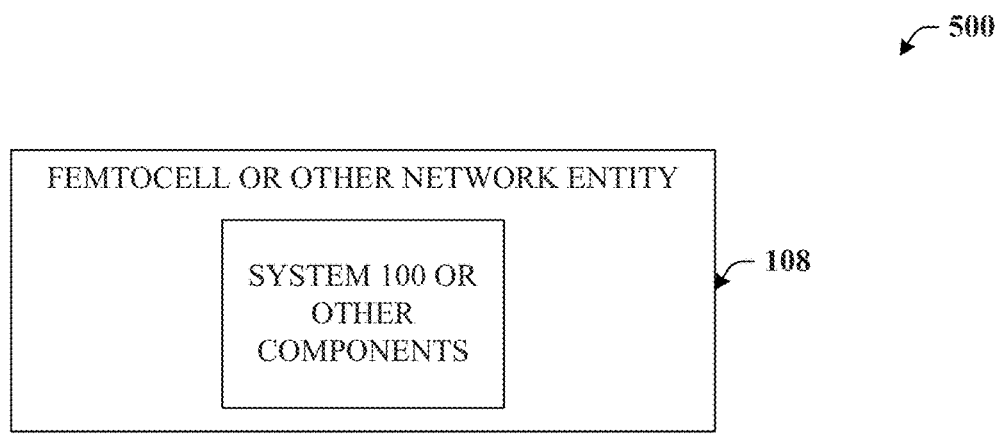
FIG. 5A depicts a block diagram of a system is configured such that all or a portion of the components described herein can be included in a femtocell or other network entity associated with the target location.
Figure 5B:
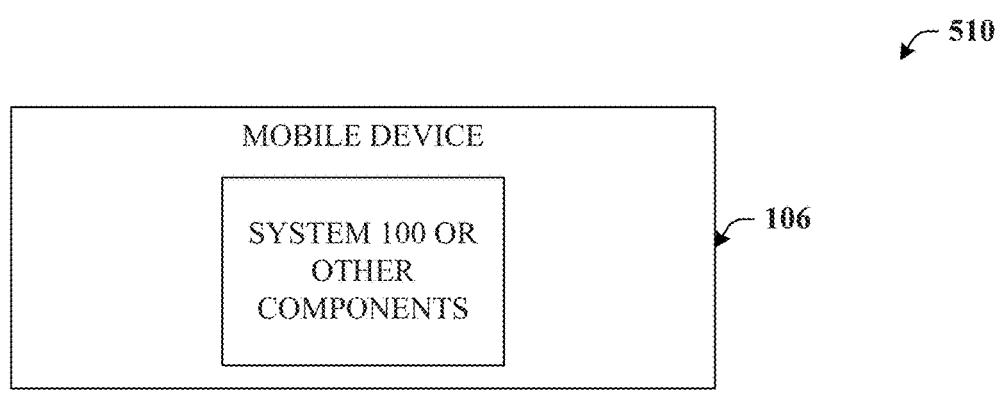
FIG. 5B illustrates a block diagram of a system in which all or a portion of the components described herein can be included in the mobile device.

With reference now to FIGS. 5A-B, various design configurations are depicted. In particular, FIG. 5A is configured such that all or a portion of the components described herein can be included in a femtocell (e.g., femtocell 202) or other network entity 108 associated with target location 110. Likewise, FIG. 5B relates to system 510 in which all or a portion of the components described herein can be included in mobile device 106.

Figure 6:
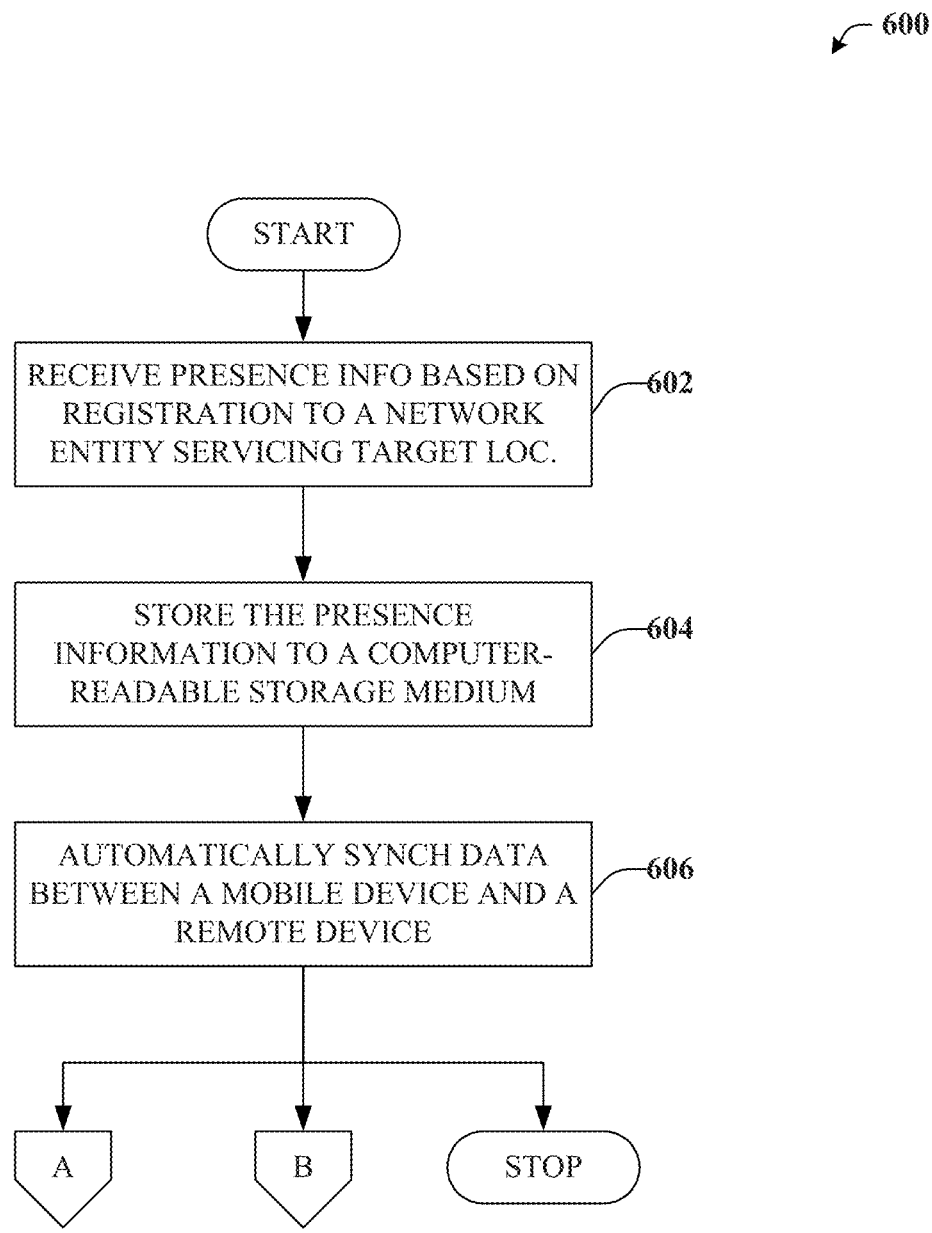
FIG. 6 depicts an exemplary flow chart of procedures defining a method for synchronization between a mobile device and a remote device based upon device presence information.
Figure 7:
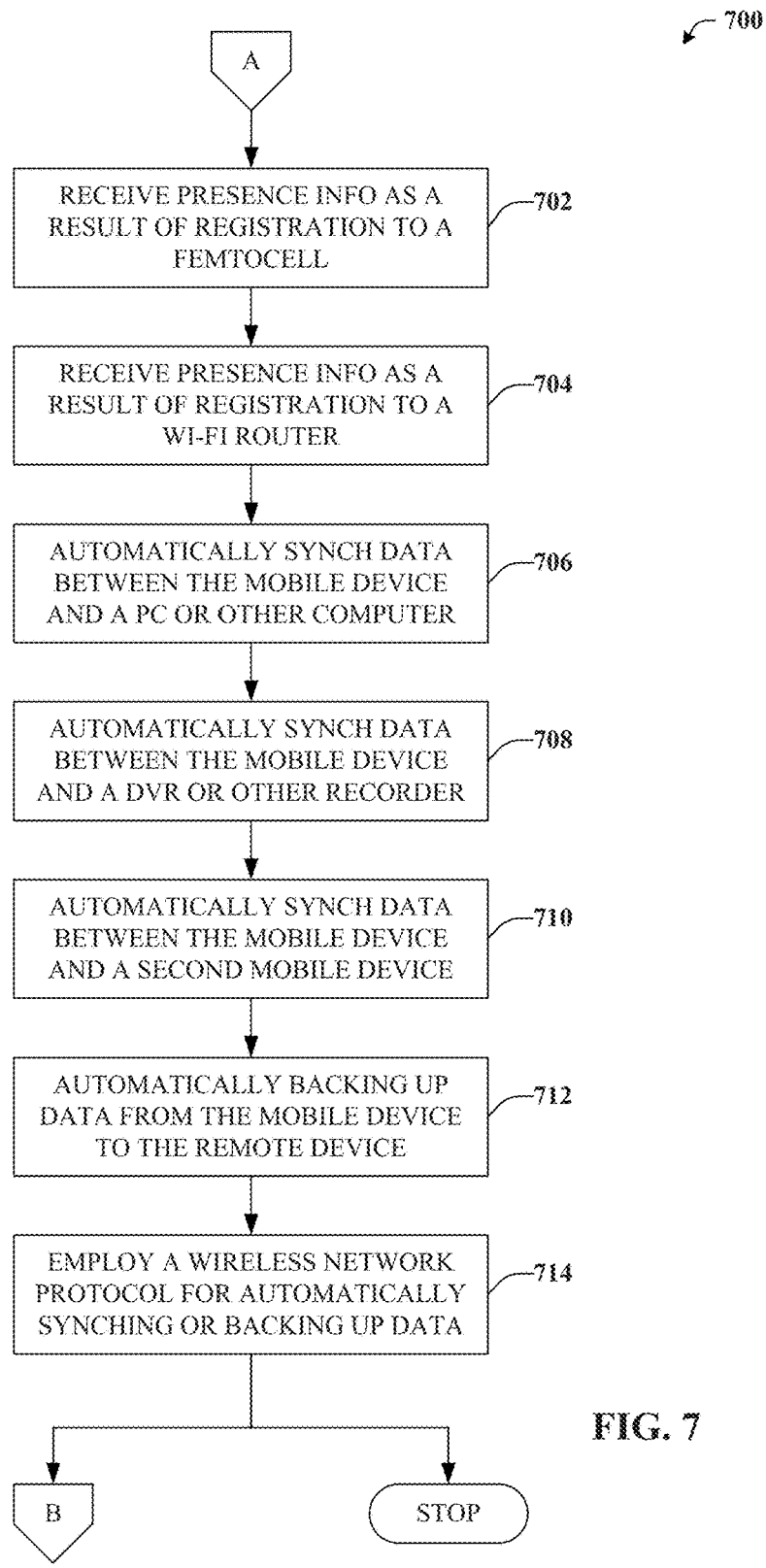
FIG. 7 is an exemplary flow chart of procedures that define a method for providing additional features or aspects in connection with synchronization between a mobile device and a remote device.
Figure 8:
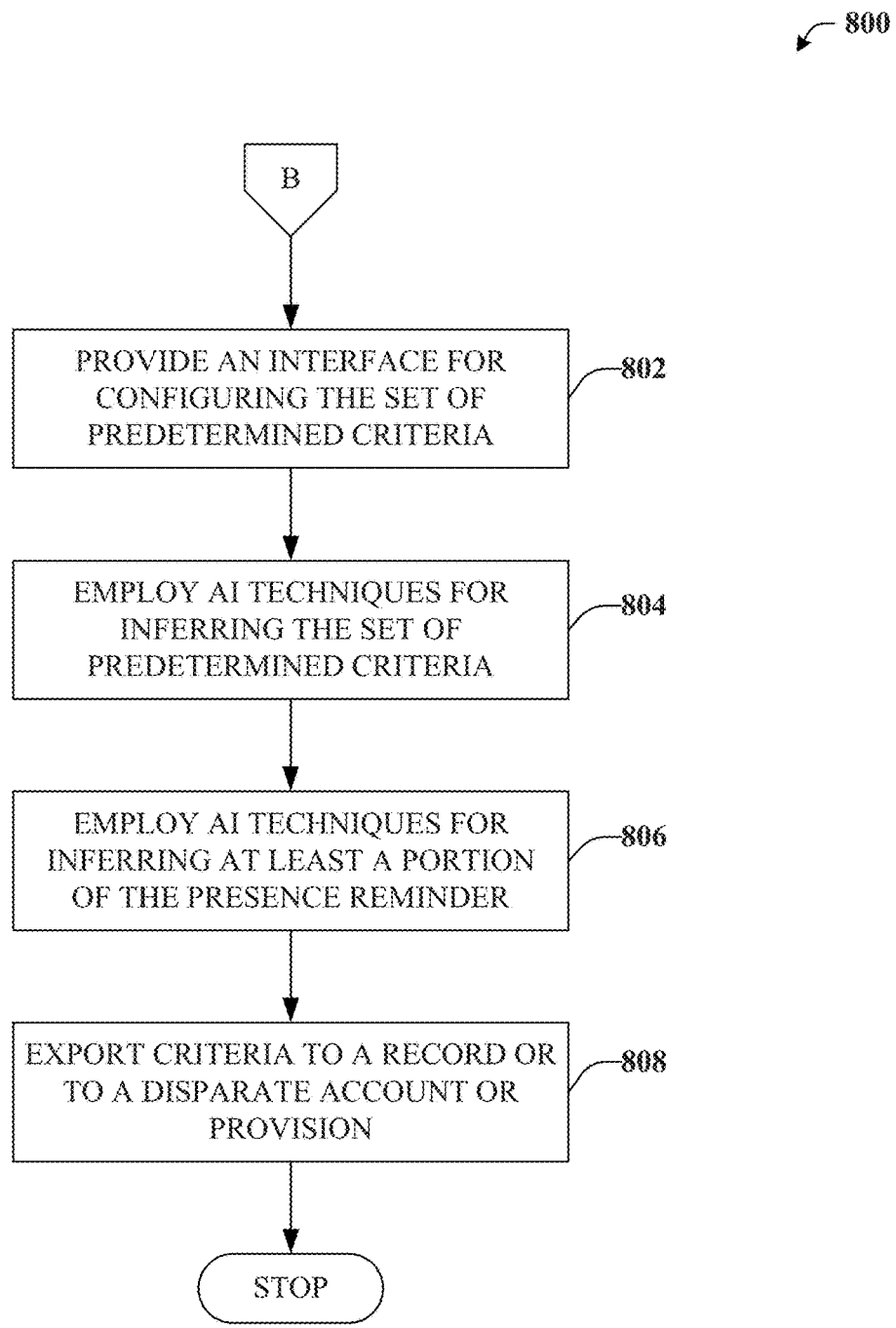
FIG. 8 depicts an exemplary flow chart of procedures defining a method for providing additional features or aspects in connection configuring the set of predetermined conditions.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 for synchronization between a mobile device and a remote device based upon device presence information is depicted. Generally, at reference numeral 602, presence information based upon registration to a network entity servicing a target location by a mobile device can be electronically received. For example, when the mobile device registers with the network entity (e.g., in order to connect to the network via the network entity), then such registration can constitute presence information indicative of the fact that the device (and therefore a user thereof) is at or near the target location.

Hence, at reference numeral 604, the presence information can be stored to a computer-readable storage medium such as to a disk or to any suitable type of memory. Appreciably, the storage can be for a short duration (e.g., when custodians do not wish the data to be maintained) or for longer-term storage. Regardless, at reference numeral 606, data can be automatically synchronized between a mobile device and a remote device according to the presence information. In other words, once presence is established, automatically synchronization can be initiated.

Turning now to FIG. 7, exemplary method 700 for providing additional features or aspects in connection with synchronization between a mobile device and a remote device is illustrated. At reference numeral 702, presence information received at reference numeral 602 of FIG. 6 can be received as a result of the mobile device registering to a femtocell (e.g., the network entity in this case) at the target location (e.g., at home). In contrast, at reference numeral 704, the presence information can be received as a result of the mobile device registering to a WI-FI router at the target location.

At reference numeral 706, data that is automatically synchronized as discussed at reference numeral 606 of FIG. 6, can be automatically synchronized between the mobile device and a personal computer or another computing device. Similarly, at reference numeral 708, data can be automatically synchronized between the mobile device and a DVR or another recording device. Likewise, at reference numeral 710, data can be automatically synchronized between the mobile device and a second mobile device, e.g., to transfer applications, content, or other data and/or to copy data for a new replacement phone, such as when automatically backing up data from the mobile device to the remote device as detailed in connection with reference numeral 712. Last to be described, at reference numeral 714, a wireless network protocol can be employed for automatically synchronizing data or automatically backing up data.

With reference now FIG. 8, exemplary method 800 for providing additional features or aspects in connection configuring the set of predetermined conditions is depicted. In general, at reference numeral 802, it can be determined whether a set of predetermined conditions is satisfied prior to performing the synchronization operation or a backup operation associated with the automatically synchronizing act of reference numeral 606. For example, if a particular set of predetermined conditions is satisfied, then an associated synch or backup operation can be initiated. Conversely, if a different set of predetermined conditions is not satisfied, then the synchronizing or backup operation associated with that set of predetermined conditions need not be initiated.

Next to be described, at reference numeral 804, an interface for configuring the set of predetermined criteria can be provided. For example, the interface can include options for setting various desired predetermined conditions as well as other related parameters (e.g., types of data to synch or backup). At reference numeral 806, the user interface can be provided via a user account webpage hosted by a communications network service provider associated with the network entity. Additionally or alternatively, at reference numeral 808, the user interface can be provided via a configuration tool or application associated with at least one of the mobile device, the remote device, or the network entity.

Figure 9:
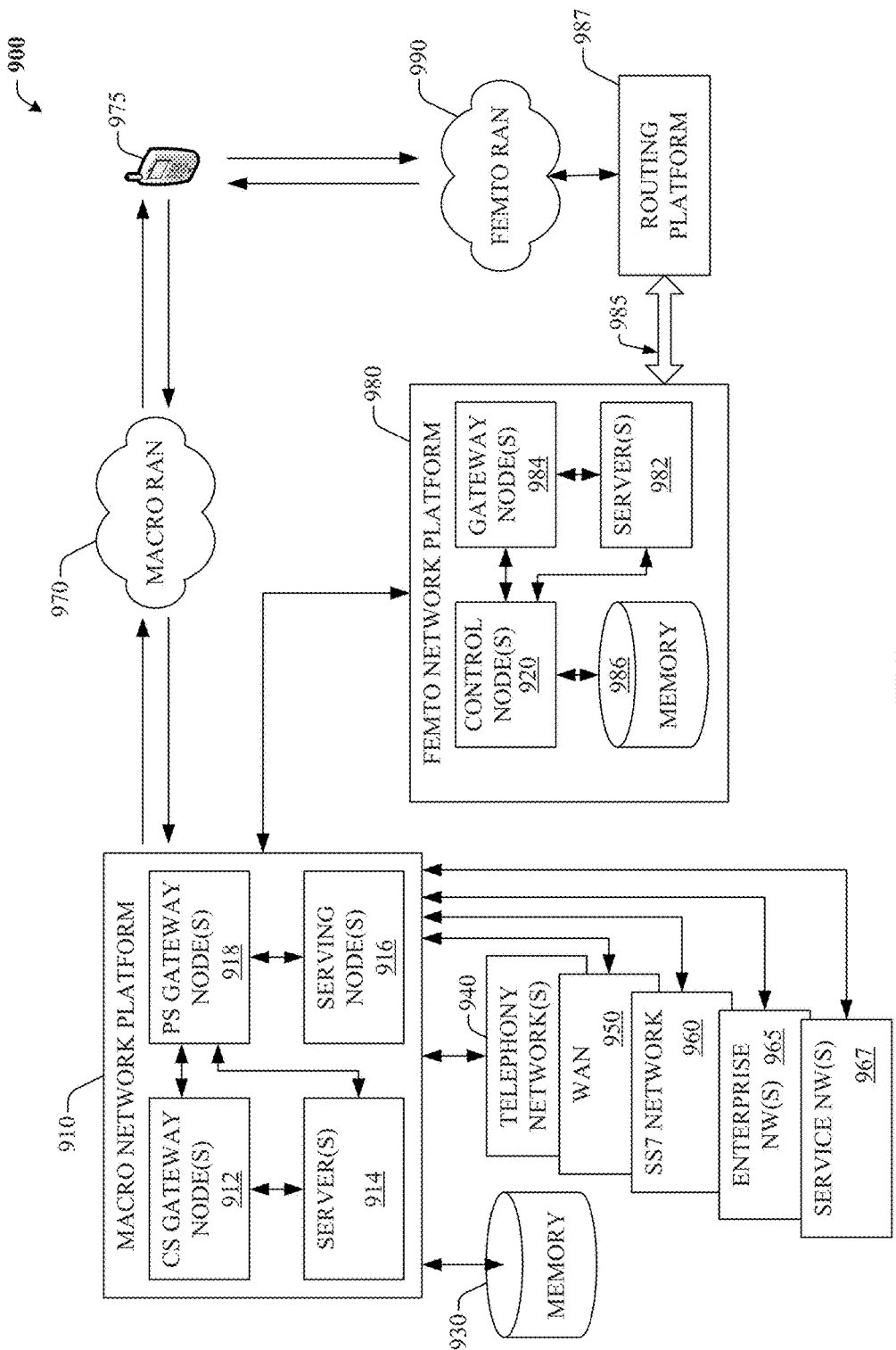
FIG. 9 illustrates an example wireless communication environment with associated components that can enable operation of an enterprise network in accordance with aspects described herein.

To provide further context for various aspects of the subject specification, FIG. 9 illustrates an example wireless communication environment 900, with associated components that can enable operation of a femtocell enterprise network in accordance with aspects described herein. Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 92 via backhaul pipe(s) 985, wherein backhaul pipe(s) are substantially the same a backhaul link 3853 below. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 1205, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IPbased, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
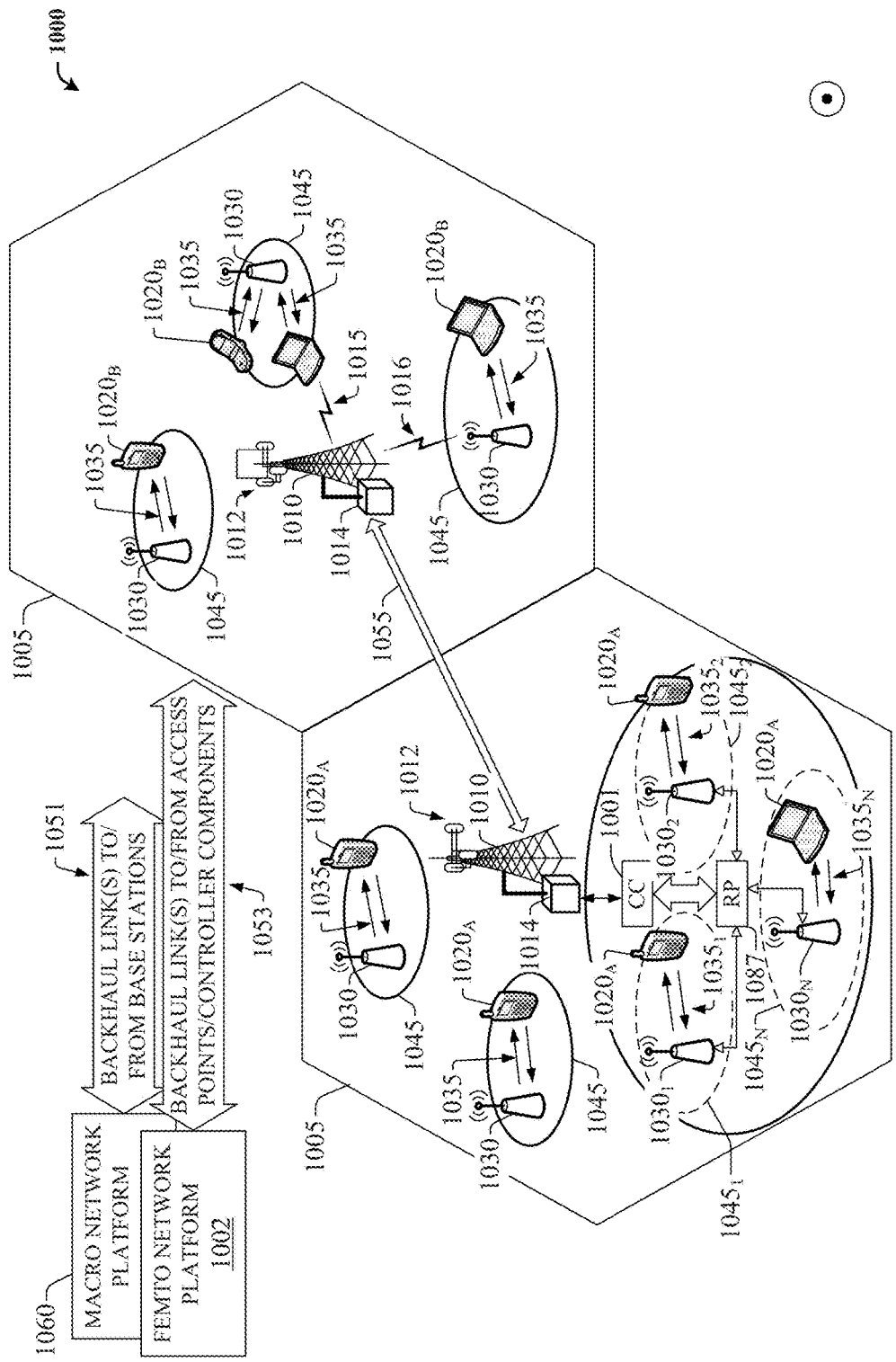
FIG. 10 illustrates a schematic deployment of a macro cell for wireless coverage in accordance with aspects of the subject specification.

FIG. 10 illustrates a wireless environment that includes macro cells and femtocells for wireless coverage in accordance with aspects described herein. In wireless environment 1050, two areas 1005 represent "macro" cell coverage; each macro cell is served by a base station 1010. It can be appreciated that macro cell coverage area 1005 and base station 1010 can include functionality, as more fully described herein, for example, with regard to system 1000. Macro coverage is generally intended to serve mobile wireless devices, like UE $1020_A$, $1020_B$, in outdoors locations. An over-the-air wireless link 105 provides such coverage, the wireless link 1215 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 102, for example, internally, to another UE $1020_A$ connected to a disparate femto AP connected to the RP 1087, or, externally, to the femto network platform 1002 via the CC 1001, as discussed in detail supra.

In wireless environment 1050, within one or more macro cell(s) 1005, a set of femtocells 1045 served by respective femto access points (APs) 1030 can be deployed. It can be appreciated that, aspects of the subject innovation are geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 330 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 11:
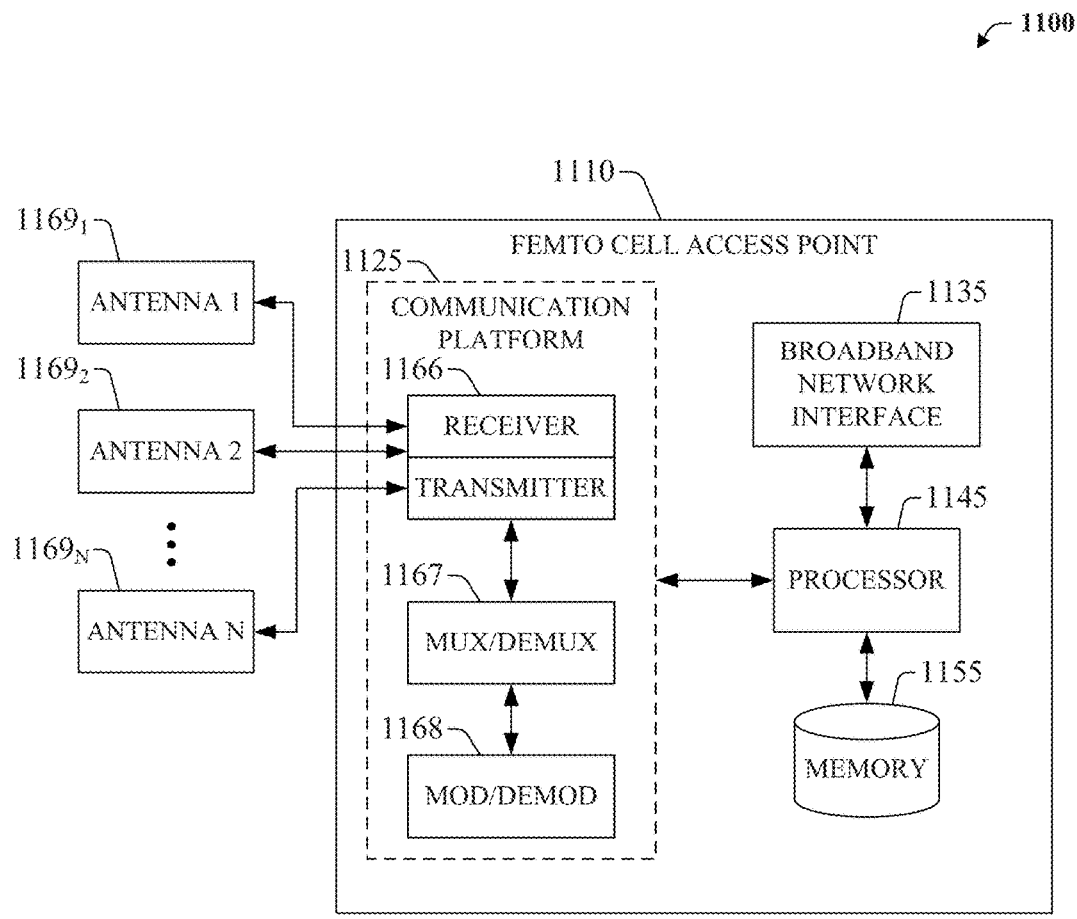
FIG. 11 illustrates a block diagram of an example embodiment of a femtocell access point.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1110 also includes a processor 1145 configured to confer functionality, at least partially, to substantially any electronic component in the femto access point 1110, in accordance with aspects of the subject innovation. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by FAP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access lists (e.g., white lists); license(s) for utilization of add-features for FAP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
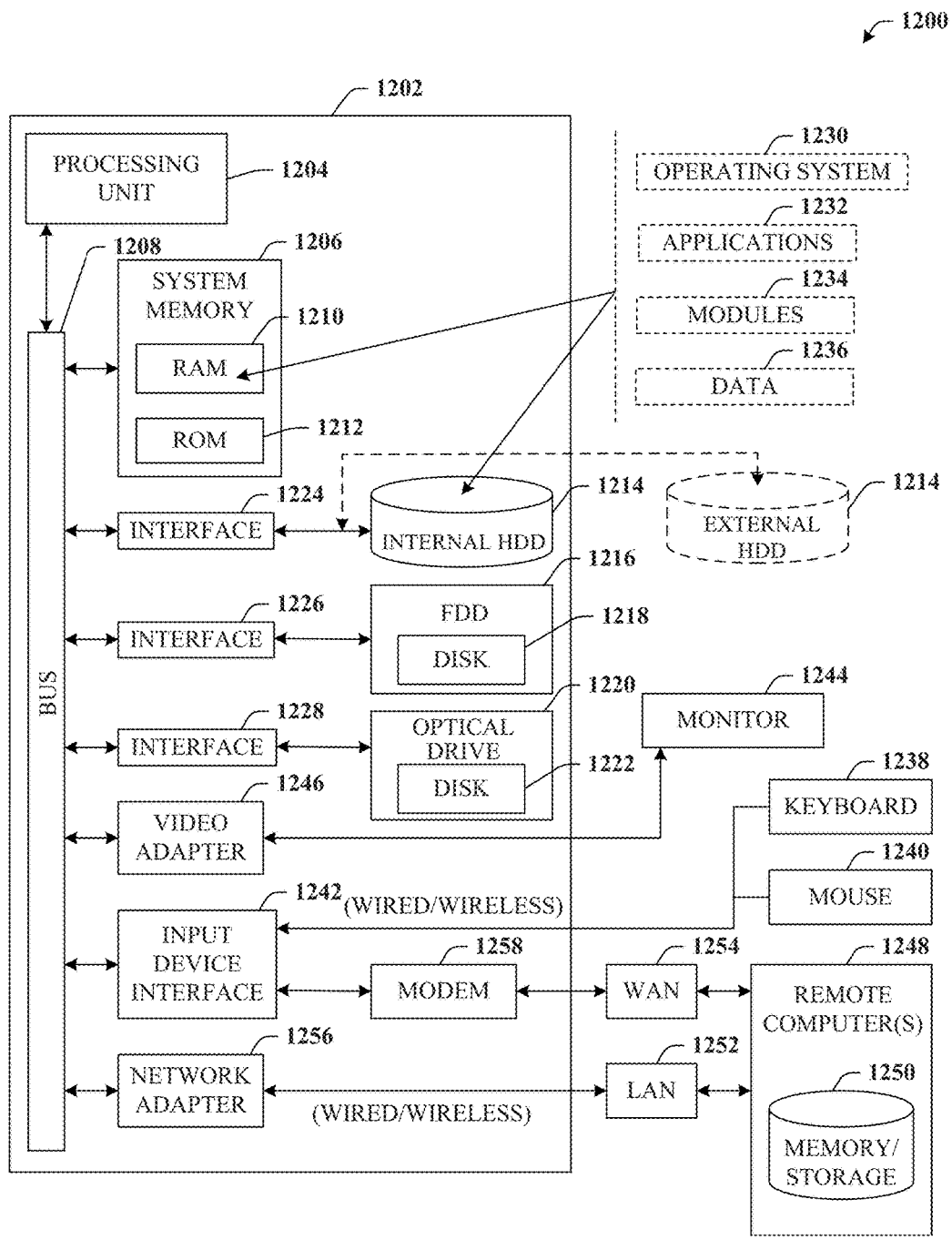
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11

(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 12 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile device," "mobile," "subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," "Node B," "evolved Node B" and other outdoor environment devices, can be utilized interchangeably in the subject application. Similarly, terms such as "femtocell", "femto," "home Node B", "micro cell" and other indoor environment devices can be used interchangeably as well. In either outdoor or indoor cases, such devices can refer to a wireless network component or appliance that serves and receives data, control, voice, video, sound, gaming, or substantially any data-stream or signaling-stream from a set of subscriber mobile devices. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network," "communications network," "network" and the like are used interchangeable in the subject application, when context for any of these term utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An access point device, comprising:
 a processor; and
 a memory that stores executable instructions that, when executed by the processor, facilitate performance of operations, comprising:
  receiving, from a first device, a request to register with a network device of a network that is accessible via the access point device that serves a defined area;
  determining that a second device is in the defined area; and
  initiating a synchronization procedure that is initiated in response to the request being received and the second device being determined to be in the defined area, wherein the synchronization procedure comprises:
   transmitting a first instruction that instructs a direct connection between the first device and the second device be established; and transmitting a second instruction that instructs an exchange of content data between the first device and the second device.

2. The access point device of claim 1, wherein the second device is a digital video recorder device, wherein the content data is recorded by the digital video recorder device, and wherein the exchange of the content data comprises a transfer of the content data from the second device to the first device.

3. The access point device of claim 1, wherein the content data is backup information representative of a state of the first device, and wherein the exchange of the content data comprises a transfer of the content data from the first device to the second device.

4. The access point device of claim 1, wherein the content data is purchased via a content provider device associated with a content provider, and wherein a copy of the content data is exchanged between the first device and the second device.

5. The access point device of claim 1, wherein the initiating the synchronization procedure comprises initiating the synchronization procedure in further response to a determination that an additional criterion has been satisfied other than the request having been received and the second device being in the defined area.

6. The access point device of claim 5, wherein the additional criterion comprises a determination that new content has been added to the first device or to the second device since a previous synchronization procedure was performed.

7. The access point device of claim 5, wherein the additional criterion comprises a determination that a specified amount of time has passed since a previous synchronization procedure was performed.

8. The access point device of claim 5, wherein the additional criterion comprises a determination that a current time is within a specified range of times.

9. The access point device of claim 5, wherein the operations further comprise receiving, from a configuration device comprising a user interface that is configured to receive input data representative of the additional criterion, the additional criterion.

10. The access point device of claim 9, wherein the user interface presents a graphical element indicative of a frequency with which the initiating the synchronization procedure is to occur.

11. The access point device of claim 9, wherein the user interface presents a graphical element indicative of a time during which the initiating the synchronization procedure is to occur.

12. The access point device of claim 9, wherein the user interface presents a graphical element indicative of a type of content to be synchronized by the synchronization procedure.

13. A method, comprising:
receiving, by a device comprising a processor, a request from a first device to register with a network device of a network that is accessible via an access point device;
determining, by the device, that a second device is in a defined space served by the access point device;
determining, by the device, that conditions are satisfied, wherein the conditions comprise a first condition that the request has been received and a second condition that the second device is in the defined space; and
triggering, by the device, a synchronization procedure in response to the first condition being satisfied, wherein the synchronization procedure comprises:
facilitating, by the device, transmitting a first instruction that instructs a direct connection between the first device and the second device be created; and
facilitating, by the device, transmitting a second instruction that instructs an exchange of content data between the first device and the second device.

14. The method of claim 13, further comprising, determining, by the device, whether new content has been added to the first device or the second device since a previous synchronization procedure was performed, wherein the conditions comprise a third condition that the new content exists.

15. The method of claim 13, further comprising, determining, by the device, whether a specified amount of time has passed since a previous synchronization procedure was performed, wherein the conditions comprise a third condition that the specified amount of time has passed.

16. The method of claim 13, further comprising, determining, by the device, whether a current time is within a specified range of times, wherein the conditions comprise a third condition that the current time is within the specified range.

17. A non-transitory machine-readable storage medium, comprising executable instructions that, when executed by a processor, facilitate performance of operations, comprising:
determining that an access point device that provides access to a network device of a network has received a request from a first device to register to network devices of the network;
determining that conditions are met, wherein the conditions comprise a first condition that the request is determined to have been received by the access point device and a second condition that a second device has been determined to be in a defined space served by the access point device; and
triggering a synchronization procedure in response to the condition being met, wherein the synchronization procedure comprises:
transmitting a first instruction that instructs a direct connection between the first device and the second device be created; and
transmitting a second instruction that instructs an exchange of content data between the first device and the second device.

18. The non-transitory machine-readable storage medium of claim 17, wherein the operations further comprise:
determining that a third condition, of the conditions, is met, wherein the third condition is whether new content has been added to the first device or the second device since a previous synchronization procedure was performed.

19. The non-transitory machine-readable storage medium of claim 17, wherein the operations further comprise:
determining that a third condition, of the conditions, is met, wherein the third condition is whether a specified amount of time has passed since a previous synchronization procedure was performed.

20. The non-transitory machine-readable storage medium of claim 17, wherein the operations further comprise:
determining that a third condition, of the conditions, is met, wherein the third condition is whether a current time is within a specified range of times.

* * * * *